United States Patent
Theisen et al.

(10) Patent No.: US 12,234,436 B1
(45) Date of Patent: Feb. 25, 2025

(54) REDUCED WASTE BEVERAGE TREATMENT APPARATUS AND METHODS

(71) Applicant: Theisen Design & Manufacturing, Inc., Waite Park, MN (US)

(72) Inventors: Peter S. Theisen, Saint Cloud, MN (US); John A. Theisen, Saint Cloud, MN (US); Adam J. Theisen, Saint Cloud, MN (US); Allen P. Theisen, Waite Park, MN (US)

(*) Notice: Subject to any disclaimer, the term of this patent is extended or adjusted under 35 U.S.C. 154(b) by 0 days.

(21) Appl. No.: 18/745,998

(22) Filed: Jun. 17, 2024

Related U.S. Application Data (62) Division of application No. 17/816,686, filed on Aug. 1, 2022, now Pat. No. 12,024,694.

(60) Provisional application No. 63/228,943, filed on Aug. 3, 2021.

(51) Int. Cl.
*C12G 3/07* (2006.01)
*C12H 1/22* (2006.01)

(52) U.S. Cl.
CPC .............. *C12G 3/07* (2019.02); *C12H 1/22* (2013.01)

(58) Field of Classification Search
None
See application file for complete search history.

(56) References Cited

U.S. PATENT DOCUMENTS

| | | | | |
|---|---|---|---|---|
| 2,092,467 A | * | 9/1937 | Newman | B65D 51/1683 217/99 |
| 7,866,254 B1 | * | 1/2011 | Karasch | C12H 1/22 144/368 |
| 2019/0084719 A1 | * | 3/2019 | Voicu | B65D 15/24 |

* cited by examiner

*Primary Examiner* — Elizabeth M Kerr
(74) *Attorney, Agent, or Firm* — Albert W. Watkins (57) ABSTRACT

A liquid treatment apparatus imparts a distinctive flavor and scent to beverages and other liquids. In one embodiment, a wooden wave insert body undulates and crosses a center line, while the wood grain runs substantially parallel to the center line and does not undulate materially. In another embodiment, a wooden plug passes through and is affixed to the wall of a beverage container, and imparts a distinctive flavor and scent through an aging process that includes controlled oxidation. The wooden plug includes a hollow bolt having a bolt opening exposed to ambient air, a closed bolt head distal to the bolt opening, and a bolt fluid exchange passage between the bolt opening and the closed bolt head. The bolt passes through the wooden block between the bolt head and container wall. The bolt fluid exchange passage couples ambient air to the wooden block interior.

17 Claims, 3 Drawing Sheets

REDUCED WASTE BEVERAGE TREATMENT APPARATUS AND METHODS

CROSS REFERENCE TO RELATED APPLICATIONS

The present application claims the benefit of U.S. provisional patent application 63/228,943 filed Aug. 3, 2021 of like title and inventorship, the teachings and entire contents of which are incorporated herein by reference.

BACKGROUND OF THE INVENTION

1. Field of the Invention

This invention pertains generally to treatment of liquids, and in a more preferred manifestation of the invention to beverage treatment apparatus and methods. In one preferred manifestation, the invention pertains to beer, wine, liquor, and other beverage making apparatus and processes and equipment, and, more specifically to an improved toasted wooden infusion apparatus and processes used to impart a distinctive flavor and scent through an aging process. In another preferred manifestation, the invention pertains to an improved apparatus and processes used to impart a distinctive flavor and scent through an aging process that further includes controlled oxidation.

2. Description of the Related Art

During various fermentation, distillation, and synthesis processes, very complex liquid mixtures of chemical compounds may be formed. Liquids to which the present invention applies, for exemplary purposes only and expressly not limiting the scope of the invention thereto, may include wine, liquor, beer, other alcoholic or spirited mixtures, vinegars, mixtures of solids and liquids such as mustard and ketchup, various other consumables, perfumes, essential oils, various other non-consumables, and the like. These liquids, as a by-product of their creation, will frequently include as components such families of compounds as alcohols, ethers, ketones, aldehydes, organic acids, amines and amides, alkaloids, sulfur compounds, and other simple and complex compounds too numerous to specifically mention herein. While some of these compounds are highly desired, others may impart a less desirable flavor or scent. However, using laboratory processes to compose or manipulate these compounds and still produce a desired product is often not possible, either economically or at all. The compositions are, quite simply, too complex for effective laboratory synthesis.

Through many centuries, a process of aging beverages such as wines, liquors, and the like in toasted or charred oak barrels has been perpetuated. Historically, this aging process occurred by keeping the beverage in a toasted or charred wooden container, whether barrel or other shape or design, for a period of time. With sufficient time, an interaction occurs between the wood and liquid contained therein. The toasted wood interacts with the various compounds described above, adsorbing and thereby removing some, reacting with others, and releasing still others into the liquid. In the case of wines and liquors, such aging allows for the ripening of the flavors and for the removal of harmful component parts of the original wine product. As a result, the wood used in the fabrication of the barrel imparts a flavor to the liquid which is characteristic of the wood and the degree of toasting or charring. In addition to the interactions directly between the liquid and wood, there is also a very small but beneficial introduction of air that seeps through the oak and into the liquid and a similar seepage and escape of some of the liquid compounds from inside the barrel out into the air. Given the appropriate oak barrel, source liquid, and sufficient time, aging will produce a highly desired resulting liquid or beverage.

Unfortunately, as is also known, the aging process in wood containers tends to be very slow and takes place over a time span often measured by years. The wood, and the flavor imparted thereby, can change according to the humidity and other atmospheric conditions surrounding the wood, often necessitating the use of special cellars or storage facilities to maintain desirable conditions while protecting the perishable containers. Furthermore, oak does not have fine, linear and consistent grain, but is instead coarse and erratic. Consequently, there exists a potential for leaks directly through the grains or any defects in the wood. Such leaks may not be revealed immediately, but may instead appear after much aging. Owing again to the erratic grains, the fabrication of barrels from wooden staves is quite costly and difficult. In addition, oak of suitable dimension and quality for fabrication of an aging barrel has become increasingly more difficult and costly to acquire. Finally, these containers can be expensive and difficult to maintain, and will require complete replacement when the aging processes have consumed the ability of the wood to interact properly with the liquid.

Alternative containers have been manufactured from other materials such as glass, plastic, and metal. These containers address many of the aforementioned drawbacks of the oak barrels, but do not infuse the liquid with the desired flavoring, nor otherwise interact in a positive way. Consequently, oak barrels continue to be highly preferred.

In order to provide the benefits obtained from oak barrels, alternative apparatus for treating the liquid have been developed. Commonly referred to as infusion or aging means, these apparatus come in a variety of shapes, sizes, materials, and the like. The prior art apparatuses for the purpose of the present disclosure are loosely grouped into wooden plugs or tubes inserted into the beverage container; non-wooden beverage containers having wooden wall panels or wall inserts; infusion sticks that are inserted into the beverage container; wooden stave beverage containers; beans and chips that are inserted into the beverage container; and other more esoteric approaches. Most of these groupings can be further subdivided based upon apparatus designed solely for a single serving or retail bottle versus apparatus designed for either a generic beverage container or for larger vats, barrels, or the like.

Exemplary U.S. and Foreign patents and published applications that illustrate infusion means for a single serving or retail bottle having a wooden dowel vented on one side to atmosphere, the teachings which are incorporated herein by reference, include U.S. Pat. No. 2,114,009 to Ramsay, entitled "Liquor aging means"; U.S. Pat. No. 2,203,229 by Nilson et al, entitled "Means for aging liquids"; and U.S. Pat. No. 3,942,423 by Herzfeld, entitled "Device for aging wine or the like"; and foreign published applications: GB 1602739 by Grose, entitled "Method of and Apparatus for Maturing Wine"; and DE9317842U1 by Scherer, entitled "Vorrichtung zur Reifung von Getranken in Flaschen (Device for ripening drinks in bottles)".

Ramsay, which is exemplary of such apparatus, illustrates cut shapes of wood with various cross-sectional geometries. These wooden dowels are provided with an enlarged top, a smooth cylindrical neck, and a cut and drilled active region.

However effective the Ramsay approach might have been, the manufacturing process required for the production of the apparatus is complex and expensive, and there is significant wood lost to waste during fabrication. Just the fabrication of the wood into a dowel or rod requires lathing or the equivalent, resulting in both significant time consumption and loss of valuable wood that would better be used to treat a beverage. In spite of the extra cost, only marginal benefit from such an apparatus may be obtained in use. One of the notable issues with the Ramsay apparatus is a lack of significant exposure of the liquid to the end grain. Consequently, the majority of the wood volume will be extracted very slowly, if at all prior to the beverage being consumed. As a result, the Ramsay apparatus wastes a great deal of wood, and yet still requires an extremely long aging period within the bottle.

Exemplary U.S. and Foreign patents and published applications that illustrate infusion means for either a generic beverage container or for larger vats, barrels, or the like that include wood vented on one side to atmosphere, the teachings which are incorporated herein by reference, include: U.S. Pat. No. 429,826 by Wagoner, entitled "Apparatus for aging wines"; U.S. Pat. No. 4,073,955 by Koppelman, entitled "Apparatus and method for aging liquor"; U.S. Pat. No. 5,537,913 by Vowles, entitled "Container for the wood maturation of wines and liquors"; U.S. Pat. No. 6,378,419 by Ecklein, entitled "Maturation process for wines"; 2006/0075901 by Eustis, entitled "Apparatus and Method for Aging Wine or Spirits"; and WO 00/55296 by Osborn, entitled "treatment of Beverage Improvements". Some of these patents use cylindrical wood tubes that suffer the same drawback of expensive fabrication and substantial waste, while others that use boards instead of tubes patents generally provide for less wood waste, but involve far more challenging assembly, essentially requiring construction equivalent to a barrel, but without the barrel staves and great pressures induced thereby, meaning they are prone to leakage and failure.

Exemplary U.S. and Foreign patents and published applications that illustrate infusion means for a single serving or retail bottle with wood wall or wall insert, the teachings which are incorporated herein by reference, include: U.S. Pat. No. 2,876,692 by Gaisman, entitled "Spirits-aging container"; GB 2188902 by Brown, entitled "Wine Maturing vessel"; WO 97/49795 by Mooney, entitled "Container and Method for Aeging Whiskey"; and WO 2016/174047 by Low, entitled "Whiskey Bottle".

In Gaisman, which is exemplary of these types of apparatus, a pair of wooden disks are provided at the top and bottom of a bottle, both exposed simultaneously to the beverage and to the outside air. Threaded rim flanges are used to screw onto a glass bottle and secure each one of the wooden disks between a flange and the bottle. The Gaisman bottle is described as providing a ratio of wood area to total volume of liquor that probably exceeds the ratio of large wooden barrels. Unfortunately, and as also known in the art of coopering, if the end grain is exposed at the major surfaces of the wood disks of Gaisman or the staves of barrels, and if the xylem vessels or tracheids that make up the wood grain pass in a direction generally from one major surface to the other, then the beverage contained therein will leak out at an extraordinary and totally unacceptable rate. In consideration thereof, coopers cut staves so that the grain extends generally parallel to the longitudinal axis of the stave. While this substantially reduces seepage, the drawback of course is the extended amount of time required to exchange with the beverage. This same requirement exists for the grain to extend in the plane of the Gaisman disks. Were the grain to extend across the thickness of the disk, not only would seepage be unacceptably great, but the disks themselves would be more prone to cracking and breaking and so would be forced to be fabricated from unacceptably thick wood. In other words then, like the Ramsay apparatus one of the notable issues of the Gaisman disks is the lack of significant exposure of the liquid to the end grain. Consequently, the majority of the wood volume will be extracted very slowly, if at all prior to the beverage being consumed. As a result then, the Gaisman bottle suffers from similar deficiencies to the Ramsay apparatus, either wasting a great deal of wood or requiring an undesirably long aging period within the bottle.

Similar apparatus for either a generic beverage container or for larger vats, barrels, or the like that include with a wood wall or wall insert, the teachings which are incorporated herein by reference, include: U.S. Pat. No. 3,106,885 by Kelley, entitled "Aging vats"; U.S. Pat. No. 4,953,730 by Prime et al, entitled "Vat"; U.S. Pat. No. 4,998,643 by Pradel, entitled "Composite wine aging container"; U.S. Pat. No. 6,752,399 by Warren, entitled "Vat seal"; U.S. Pat. No. 7,240,609 by Berecz, entitled "Rigid framed wine barrel with replaceable wood panels"; U.S. Pat. No. 8,689,678 by Eustis, entitled "Apparatus for aging wine or spirits"; U.S. Pat. No. 9,701,439 by Visentin, entitled "Composite Stainless Steel and Wood Barrel"; U.S. Pat. No. 9,885,010 by Karasch, entitled "Apparatus and method for aging liquids"; U.S. Pat. No. 10,590,370 by Karasch, entitled "Apparatus and method for aging liquids"; 2003/0233944 by Sugden, entitled "Plates for flavouring or ageing wine or other beverage"; 2004/0129680 by Andries, entitled "Wine Vat or Barrel"; 2006/0060089 by Sugden, entitled "Treatment of liquids"; 2007/0000929 by Fernandez, entitled "Deposit for Fermenting, Aging or Storing Wine"; 2020/0010785 by Monahan, entitled "System and method for treating beverages"; and EP1739163A1 by Echepare Fernandez, entitled "Deposit for fermenting, ageing or storing wine". As with the Gaisman bottle, the combination of seepage, strength, and aging time present obstacles to successful implementation.

A particular challenge in the prior art incorporating wooden panel walls or inserts is achieving the proper sealing of the wood, and between the wood and the non-wooden container components. In the case of a wooden barrel, a great deal of force is applied to the wood, and then the wood is retained by heavy metal rings. This initial sealing force is so great that heavy oak staves may break during the assembly process, particularly if there is a grain defect. Once filled with liquid, the wood may further expand, ensuring a very tight seal between adjacent wooden staves. However, these major forces required by a cooperage to assemble an oak barrel are a part of the associated cost and such forces would not even be possible in other more frangible beverage containers, and so other techniques of ensuring a seal are highly desired.

The aforementioned apparatuses generally provide a highly desired combination of wood treatment and wood interaction with atmospheric air. However, for many beverages the atmospheric interaction is not required. In such instances, infusion sticks are known that may be inserted into a beverage container to provide desired beverage treatment.

Exemplary U.S. and Foreign patents and published applications that illustrate infusion sticks for a single serving or retail bottle, the teachings which are incorporated herein by reference, include: U.S. Pat. No. 2,487,594 by Rudnick, entitled "Means for aging alcoholic liquors in bottles"; U.S. Pat. No. 7,594,468 by Kania et al, entitled "Wooden spiral for flavoring wine and method of manufacturing same"; U.S. Pat. No. 10,031,015 by Centioli, entitled "Beverage multi-tool"; U.S. Pat. No. 10,041,027 by Evans et al, entitled "Method for aging or maturing ethyl or ethanol alcohol based beverages"; U.S. Pat. No. 10,793,815 by Giildenzopf, entitled "Method of producing a finished, aged distilled spirit"; U.S. Pat. No. 11,214,766 by Evans et al, entitled "Method for aging or maturing ethyl or ethanol alcohol based beverages"; 2011/0268838 by Vondrasek et al, entitled "In-container beverage enhancement device and method"; 2021/0017479 by Giildenzopf, entitled "Method of producing a finished, aged distilled spirit"; 2022/0056384 by Reed, entitled "Flavoring member combined with container cap"; GB 1909/05042 by Maloney, entitled "Improvements in blending, colouring and maturing wines, spirits and the like"; GB 2477308 by Short, entitled "A container and a container insert"; and WO 2021/178940 by Ryan, entitled "Enhanced chemical and physical aging of spirits".

Related infusion sticks for either a generic beverage container or for larger vats, barrels, or the like, the teachings which are incorporated herein by reference, include: U.S. Pat. No. 2,064,330 by Yocum, entitled "Process for purifying and aging spirituous liquors"; U.S. Pat. No. 8,889,206 by Lix, entitled "Whiskey making method"; 2016/0097023 by Peniche, entitled "Capillary whisky sticks"; and 2020/0283709 by Paetzold, entitled "Method for modifying the organoletic properties of an alcoholic beverage".

Some of these prior art infusion sticks fail to provide adequate access between the beverage and xylem vessels or tracheids that make up the wood grain, meaning such infusion sticks will require undesirably long aging time. Others of these prior art infusion sticks still include a substantial amount of wood that is effectively unusable. For example, the grooved wooden sticks such as illustrated by Paetzold not only require a substantial number of cuts, thereby wasting a relatively high percentage of the valuable wood and simultaneously requiring substantial energy and cost for production, but also leave a "backbone" of wood that is of length substantially greater than the length of the xylem vessels or tracheids that make up the wood grain between the cuts. This means that the amount of time required for the beverage to interact with the xylem vessels or tracheids that make up the wood grain in the backbone is so much greater than that required for the wood between the cuts that the vast majority of the backbone wood never interacts with the beverage, meaning the backbone wood is essentially unusable as well.

Several of the present inventors have also devised apparatus to treat beverages, as illustrated in U.S. Pat. No. 7,357,069 by Karasch et al, entitled "Beverage infusion spiral and methods of making and using the same"; and U.S. Pat. No. 7,866,254 by Karasch et al, entitled "Beverage infusion spiral and methods of making and using the same". While the apparatus disclosed in these patents has presented great benefit for a number of beverages, including much more rapid exchange between the wood and beverage, quantity-limited exchange, and excellent quality control visual validation of the quality of the oak, they fail to provide controlled oxidation that would otherwise be obtained through a wooden barrel wall, suffer from significant wood waste and undesirable cost associated with fabrication, have backbone wood that never interacts with beverage, and are prone to undesirable breakage of portions during manufacture, shipping, and handling.

Other artisans insert oak staves or boards directly into a beverage container or vat. Exemplary of these patents are U.S. Pat. No. 2,017,235 to Drew, entitled "Apparatus for aging alcoholic spirits"; U.S. Pat. No. 2,079,378 to Mills, entitled "Charred white oak rack for aging or maturing, clarifying, coloring, and mellowing spirituous liquors, and particularly whisky"; U.S. Pat. No. 2,289,245 to Dant, entitled "Apparatus for aging whisky"; U.S. Pat. No. 5,054,381 to DePeaux et al, entitled "Method for contriving an insert in a receptacle, means for performing the method, and receptacles provided with such means"; and U.S. Pat. No. 5,647,268 by Sullivan, entitled "Infusion sleeve for wine barrels". These approaches permit the continued re-use of a barrel, by permitting replacement of the staves that have been inserted, rather than requiring an entirely new container. Nevertheless, these boards do not provide the beneficial interaction with exterior oxygen, they use relatively larger and therefore more expensive pieces of knot-free wood, and they do not provide for rapid aging, meaning the beverage must soak with the wood for an extended period before being released commercially. Furthermore, since there are no reasonable inherent limits on the degree of interaction between liquid and oak other than extremely long aging periods, the interaction must be monitored to impart a consistent desired flavor.

U.S. published application 2020/0362287 by Bolt, entitled "Bottle for storing and aging beverages", the teachings and contents which are incorporated herein by reference, describes a single serving wooden stave bottle. As already mentioned herein above, a particular challenge in the prior art is achieving the proper sealing of the wood. In the case of a wooden barrel, a great deal of force is applied to the wood, and then the wood is retained by heavy metal rings. This initial sealing force is so great that heavy oak staves may break during the assembly process, particularly if there is a grain defect. Once filled with liquid, the wood may further expand, ensuring a very tight seal between adjacent wooden staves. Consequently, these major forces required by a cooperage to assemble an oak barrel are difficult and expensive to reliably achieve in a single serving bottle.

Some artisans have provided features and constructions for barrels that help to improve their efficacy. Exemplary patents, the teachings and contents which are incorporated herein by reference, include: U.S. Pat. No. 3,372,633 by Horlander, entitled "Whiskey barrel"; U.S. Pat. No. 10,000,729 by Karasch, entitled "Apparatus and method for aging liquids"; U.S. Pat. No. 10,184,098 by Janssen, entitled "Wooden vessel for the aging of liquid"; and U.S. Pat. No. 10,260,032 by Karasch, entitled "Apparatus and method for aging liquids". While beneficial, as is very apparent each of these approaches still requires the expense of a coopered barrel.

In order to provide more universal application, and to avoid the need for larger knot or defect-free lengths of oak, various artisans have proposed the use of smaller chips or cubes of wood, sometimes referred to as beans, which are then held within one of a variety of permeable secondary containers within the larger container. Exemplary patents applicable to single serving or retail bottles, the teachings and contents which are incorporated herein by reference, include: U.S. Pat. No. 818,478 by Shwayder, entitled "Receptacle for storing alcoholic liquors"; and U.S. Pat. No. 2,086,073 by Frencescon, entitled "Aging potable liquids in glass containers". Exemplary patents applicable to generic beverage container or for larger vats, barrels, or the like, the teachings which are incorporated herein by reference, include: U.S. Pat. No. 1,976,091 to Pritchett, entitled "Process for preparing means for mellowing beverages"; U.S. Pat. No. 2,203,229 to Nilsson et al, entitled "Means for aging liquids"; U.S. Pat. No. 5,102,675 by Howell et al, entitled "Method for producing and using oak in divided form for flavoring wine"; and U.S. Pat. No. 5,481,960 to Sullivan, entitled "Infusion tube for wine barrels". Other related patents describing early beer chips, predecessors to modern chips and cubes but often primarily intended to clarify the beverage, the teachings and contents which are incorporated by reference, include: U.S. Pat. No. 257,977 by Rice, entitled "Beer chip"; U.S. Pat. No. 273,860 by Lachenmeyer, entitled "Brewer's shavings"; U.S. Pat. No. 279,019 by Rice, entitled "Beer chip"; U.S. Pat. No. 286,637 by Rice, entitled "Beer chip"; U.S. Pat. No. 295,944 by Rice, entitled "Beer chip"; and U.S. Pat. No. 305,227 by Rice, entitled "Beer chip"

These approaches offer the benefit of many smaller chips and cubes of wood, to obtain similar surface area as that present on the inside of a wooden barrel. The cubes may readily be replaced at will. Furthermore, wood that cannot otherwise be used in beverage making, for exemplary and non-limiting purpose including wood that has been perforated by oak bores and small scrap wood resulting from the fabrication of staves and barrels, can often be converted to small chips and cubes.

However, these chips and cubes can stack tightly upon each other during beverage treatment, thereby substantially reducing the effective exposed surface area. Consequently, the time required for desired aging may in fact be quite unpredictable, since the interaction between liquid and wood will depend upon how the cubes happen to stack within a given container. Furthermore, the small chip and cube size is also more troublesome with more viscous liquids such as pastes, presenting problems both during infusion and with separation of liquid from cubes. In addition, they fail to provide controlled oxidation desired for some beverages. Finally, and perhaps of greatest importance in the industry, these cubes are not readily identifiable to their source within a tree. Very harmful flavorings may be extracted from wood which is either core wood, knotty, or presents other defects. Yet, when the wood is cut into these small chips or cubes, such defects will not readily present themselves. As a result, the wine maker, spirits brewer, distillery, or other liquid processor loses much ability to inspect and control the quality of the wood used. This has led to a complete rejection of the chips and cubes by many producers.

Other more esoteric approaches have been presented for the treatment of spirits, exemplified by U.S. Pat. No. 334,222 to Fitch, entitled "Apparatus for aging spirituous liquors, wines, etc."; U.S. Pat. No. 2,195,662 to Van Sant, entitled "Process of treating an alcoholic beverage"; U.S. Pat. No. 10,196,595 by Butte, entitled "Accelerated aging of alcohol drinks"; and 2012/0196016 by Palmer, entitled "Tank for the storage and/or maturation of an alcoholic beverage". Nevertheless, these prior art approaches have not provided sufficient benefit for the distiller, wine maker, chemical processor, or other producer to gain wide spread acceptance.

As also noted herein above, cooperages must use high quality pieces of wood to make their barrels, which are correspondingly costly and in short supply. Often those pieces of wood are larger than the resultant barrel. This results in trimming of pieces of the high quality wood, which due to the diminished dimensions cannot be used to make another barrel, and thus are high quality waste. Along with the trimmings, any broken staves are unusable for barrel production but are also high quality waste. Similarly, wood with insect bore holes or knots are unsuitable for staves, but still present the desirable characteristics of the wood for beverage infusion treatment. Utilizing these high quality pieces of wood is extremely desirable.

As may be apparent, in spite of the enormous advancements and substantial research and development that has been conducted, there still remains a need for an improved container that reduces the need for expensive wood or costly fabrication, that can reduce the aging time and associated inventory, and can still preserve as many of the benefits of a prior art wooden barrel as possible.

In addition to the foregoing patents, Webster's New Universal Unabridged Dictionary, Second Edition copyright 1983, is incorporated herein by reference in entirety for the definitions of words and terms used herein.

SUMMARY OF THE INVENTION

In a first manifestation, the invention is, in combination, a wooden wave insert, a beverage aging container, and a beverage contained with the beverage aging container. The wooden wave insert comprises a longitudinally extensive wood body having a first surface, a second surface, and wood grain extending substantially parallel to the longitudinal axis of the longitudinally extensive body between the first and second body surfaces. A centerline is parallel to a longitudinal axis of the longitudinally extensive body. The longitudinally extensive body undulates entirely across the centerline while transecting at least some of the wood grain, thereby exposing the wood grain ends. The first and second body surfaces and the wood grain alternate along the longitudinal axis of the longitudinally extensive body between a first position along the longitudinal axis of the longitudinally extensive body where the first and second body surfaces and the wood grain are all located entirely on a first side of the centerline, and a second position displaced from the first position along the longitudinal axis of the longitudinally extensive body where the first and second body surfaces and the wood grain are all located entirely on a second side of the centerline opposite to the first side of the centerline. The wooden wave insert is at least partially submerged in and exchanging with the beverage contained within the beverage aging container.

In a second manifestation, the invention is a wooden wave insert. The wooden wave insert comprises a longitudinally extensive wood body having a first surface, a second surface, and wood grain extending substantially parallel to the longitudinal axis of the longitudinally extensive body between the first and second body surfaces. A centerline is parallel to a longitudinal axis of the longitudinally extensive body. The longitudinally extensive body undulates entirely across the centerline while transecting at least some of the wood grain, thereby exposing the wood grain ends. The first and second body surfaces and the wood grain alternate along the longitudinal axis of the longitudinally extensive body between a first position along the longitudinal axis of the longitudinally extensive body where the first and second body surfaces and the wood grain are all located entirely on a first side of the centerline, and a second position displaced from the first position along the longitudinal axis of the longitudinally extensive body where the first and second body surfaces and the wood grain are all located entirely on a second side of the centerline opposite to the first side of the centerline.

In a third manifestation, the invention is, in combination, a wood plug, a beverage aging container, and a beverage contained in the beverage aging container. The beverage aging container has at least one wall defining an interior within which the beverage is retained. The wood plug comprises: a wood block having a pair of opposed sides and wood grain defining a wood grain longitudinal axis; and a hollow bolt having a bolt opening exposed to ambient air, a closed bolt head distal to the bolt opening, and a bolt fluid exchange passage between the bolt opening and the closed bolt head. The bolt fluid exchange passage couples the ambient air to the wood block. The wood plug is inserted through and secured to the wall in the beverage aging container.

OBJECTS OF THE INVENTION

Exemplary embodiments of the present invention solve inadequacies of the prior art by providing improved liquid treatment apparatus for use in imparting a distinctive flavor to wines, beverages, and other liquids. In one preferred embodiment, the invention pertains to beer, wine, liquor, and other beverage making apparatus and processes and equipment, and, more specifically to an improved toasted wooden infusion apparatus and processes used to impart a distinctive flavor and scent through an aging process. In another preferred manifestation, the invention pertains to an improved apparatus and processes used to impart a distinctive flavor and scent through an aging process that further includes controlled oxidation.

The present invention and the preferred and alternative embodiments have been developed with a number of objectives in mind. While not all of these objectives are found in every embodiment, these objectives nevertheless provide a sense of the general intent and the many possible benefits that are available from embodiments of the present invention.

A first object of the present invention is to infuse a liquid using wood, without having to age the liquid for extended periods in a wood container. A second object of the invention is to allow for more control over the time required to properly age the liquid and to impart desired chemical constituents while reacting or removing other constituents. Another object of the present invention is to decrease the amount of time required to age wine. A further object of the invention is to enable the apparatus designed in accord with the invention to be shaped and sized to fit any container from a huge wine barrel to a small liquor bottle. Yet another object of the present invention is to enable replacement of the treatment apparatus with a different treatment apparatus. A further object of the present invention is to provide a geometry that will prevent packing of treatment apparatus, thereby providing more consistent and predictable liquid treatment. Another object of the invention is to reduce waste from machining and cutting, and reduce unusable wood content in the treatment apparatus. Yet another object of the present invention is to enable previously unusable wood scrap to be used in the production of high quality beverage treatment apparatus. An additional object of the invention is the provision of an infusion apparatus meeting the foregoing objectives using manufacturing processes which allow the apparatus to be produced economically.

BRIEF DESCRIPTION OF THE DRAWINGS

The foregoing and other objects, advantages, and novel features of the present invention can be understood and appreciated by reference to the following detailed description of the invention, taken in conjunction with the accompanying drawings, in which.

DESCRIPTION OF THE PREFERRED EMBODIMENT

Figure 1:
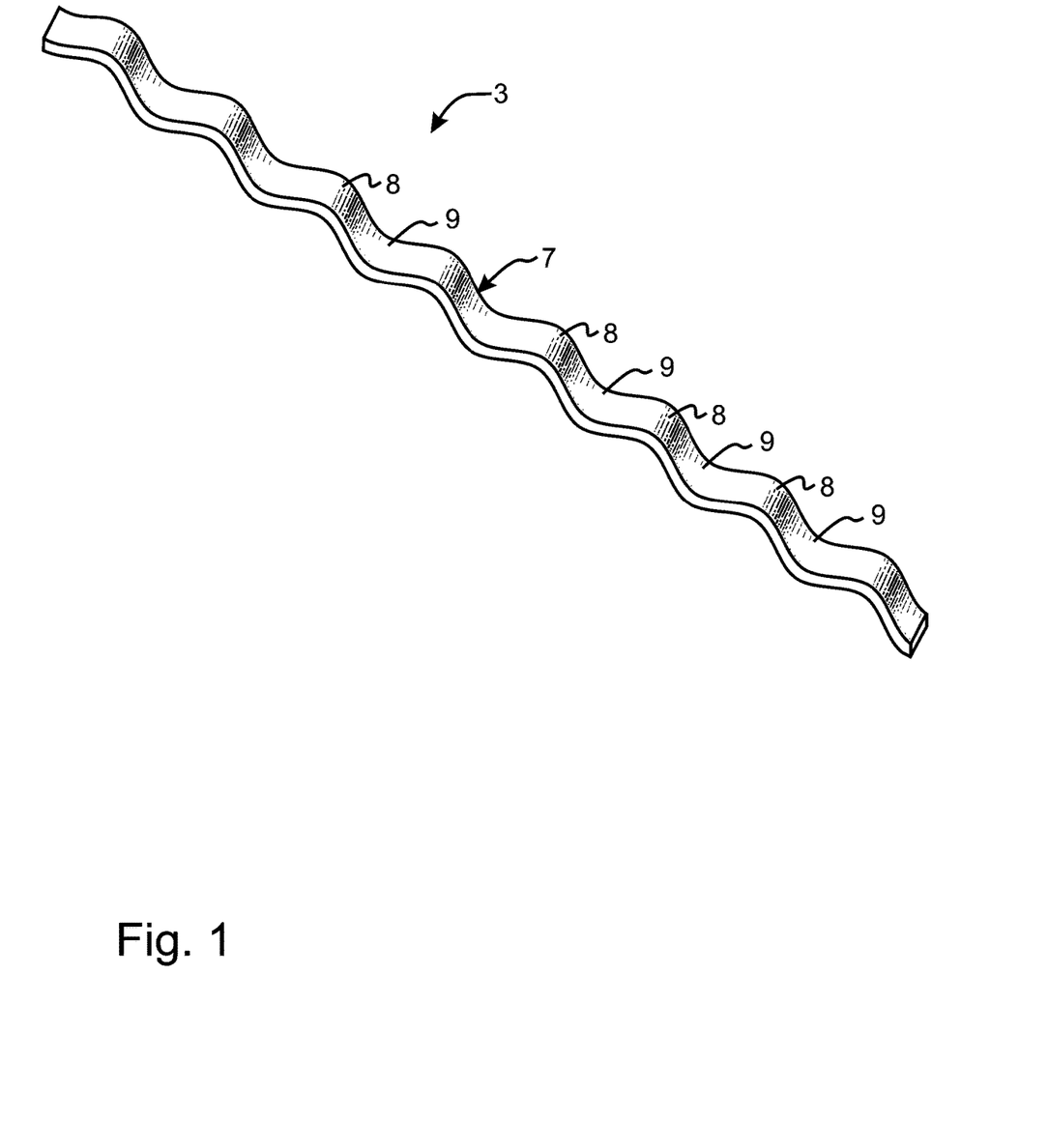
FIGS. 1-3 illustrate a preferred embodiment reduced waste beverage treatment wave designed in accord with the teachings of the present invention from projected, front elevational, and left side elevational views, respectively.
Figure 2:
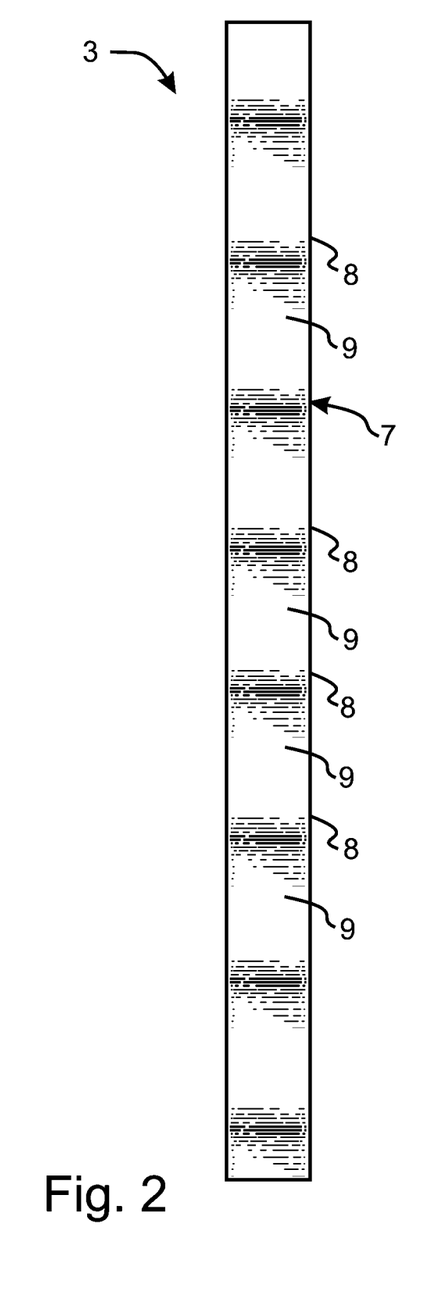
Figure 3:
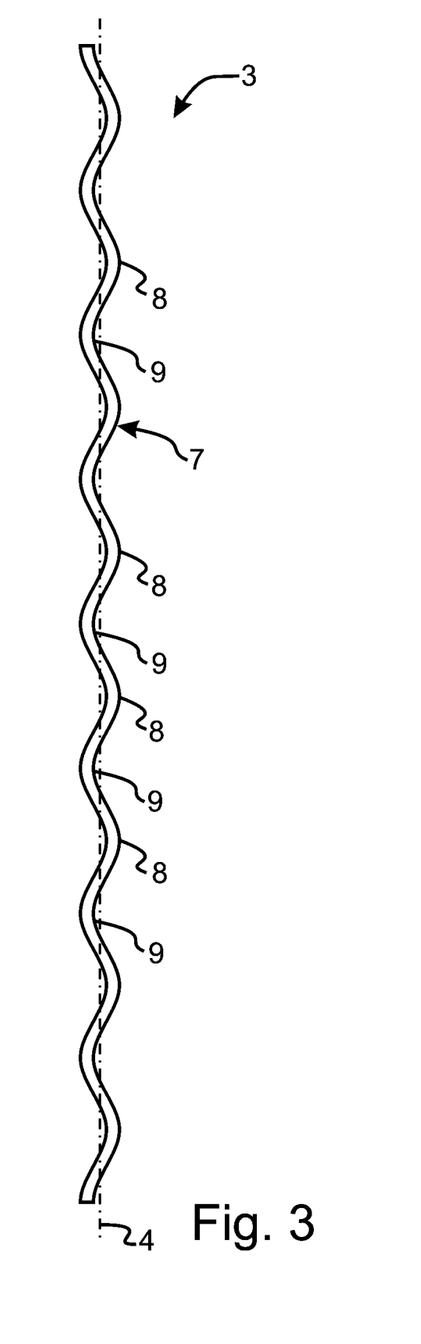

Manifested in the preferred embodiment of the invention illustrated in FIGS. 1-3, the present invention provides a wave insert 3 comprising a wave body 7 fabricated from a suitable wood, for exemplary and non-limiting purposes such as oak, cherry, apple, or other wood suitable for imparting a desired flavor within a beverage. The wood may be treated in any suitable manner, for exemplary and non-limiting purpose such as by toasting, charring, or other treatments disclosed in the patents incorporated herein above by reference, or by other techniques known in the art.

Wave body 7 comprises an indeterminate length, having a plurality of wave peaks 8, each alternating with one of a plurality of wave valleys 9. This combination of alternating wave peak 8 and wave valley 9 defines an undulating shape or geometry.

As illustrated in FIG. 3, the undulating shape of wave insert 3 has been selected to ensure that with each transition from a wave peak 8 to a wave valley 9, and from a wave valley 9 to a wave peak 8, wave body 7 will completely cross centerline 4. The grain of the wood that comprises wave body 7 is also chosen to run longitudinally substantially parallel to centerline 4. This combination results in the entirety of the wood grain being exposed on each end of the grain through each full undulation. This keeps even the longest of xylem vessels or tracheids that make up the wood grain to a length less than the length of one full undulation wave. In a preferred embodiment, the thickness of wave body 7 as viewed from the view of FIG. 3 is selected in combination with the path and degree of undulation to keep the xylem vessels or tracheids that make up the wood grain to a range of lengths that will allows for maximum penetration of a liquid throughout the entirety of the wave insert in a short time period, and allows for an ideal exchange of the various compounds between the wood and liquid. In some embodiments, the geometry is selected to provide a predictable exchange between a beverage liquid and wave body 7 for a desired period of time, with carefully controlled and predictable beverage treatment. In some embodiments, the predictable exchange is a substantially complete exhaustion of material within the xylem vessels or tracheids that make up the wood grain.

Those familiar with wood will understand that the xylem vessels or tracheids that make up the wood grain are not orderly nor perfectly linear. Instead, wood grain meanders about while in most cases still extending in a visually or otherwise identifiable direction. For the purposes of the present disclosure, the grain of the wood that comprises wave body 7 will be defined as extending substantially parallel to centerline 4 when identifiable direction of the wood grain extends parallel to centerline 4.

While the particular shape of wave insert 3 may be varied, the opposing sides of wave insert 3 crossing past centerline 4 means that there is no wasted wood that does not interact with the beverage. In addition, wave insert 3 may be fabricated from a wood remnant or scrap, such as a wood block. The wood remnant or scrap may, for exemplary and non-limiting purpose, be a wooden block cut from a board used to make staves and barrels. In such instance, a large number of wave inserts 3 may be either sequentially or gang-cut from the wooden block. Noteworthy here is the fact that the undulation waves are formed during separation of the wave insert 3 from a wooden block, and not by later steaming and forming or the like. If the undulations in wave insert 3 were formed by steaming and bending or other bending techniques, then the wood grain would also undulate, and would not be transected by the undulations. This in turn would mean that the wood grain would extend for the entire length of wave body 7, which is contrary to the teachings of the present invention.

Wave insert 3 achieves multiple benefits compared to prior art cubes or chips. As may readily be appreciated, wave inserts 3 are easily individually visually inspected for quality of wood and any defects, they have a long length for easy removal from the liquid, and they can be fabricated from high quality barrel making wood remnants that are otherwise sold or used as scrap wood. Along with the stave trimmings, broken staves that are unusable for barrel production but that still have sufficient grain longitudinal length may be used in the production of wave inserts 3. Similarly, wood with insect bore holes or knots are unsuitable for staves, but still present the desirable characteristics of the wood required for wave inserts 3 to treat a liquid such as an alcoholic beverage. Consequently, the present invention as embodied in wave insert 3 enables many types of previously unusable wood scrap to be used in the production of high quality beverage treatment apparatuses.

Wave inserts 3 are also structurally sound, making them durable for packaging, shipping, and handling. Since the dimension of wave inserts 3 will be chosen for a particular application, wave inserts 3 will be sized and produced in different embodiments for insertion into beverage bottles, for use as a stir or "swizzle" stick directly in a poured beverage, for insertion into fermentation containers, and for other suitable beverage interaction.

Preferred embodiment wave inserts 3 have substantially reduced cutting and machining waste, only requiring a single undulating cut to separate a wave insert 3 from a larger board. In addition, the entirety of wave body 7 is used in the treatment of a liquid, meaning a preferred embodiment wave insert 3 has no unusable wood content. When a plurality of wave inserts 3 are used in a common container, such as a beverage barrel or vat, the undulations between alternating wave peak 8 and wave valley 9 will in most random arrangements prevent a wave insert 3 from adhering to or blocking the liquid from reaching adjacent ones of wave inserts 3.

Figure 4:
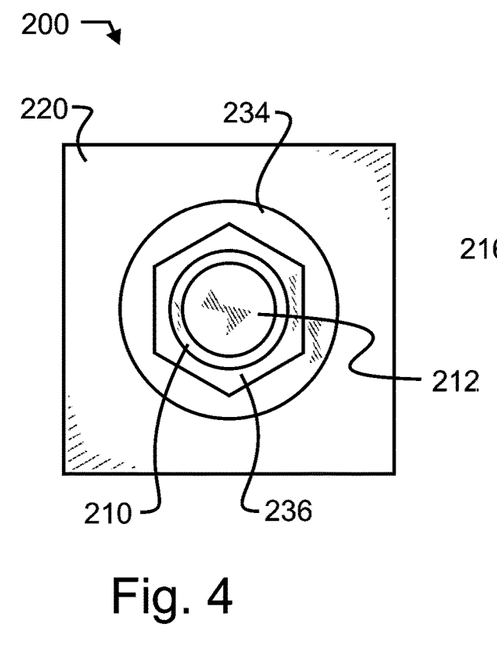
FIGS. 4-5 and 7 illustrate a preferred embodiment reduced waste beverage treatment plug designed in accord with the teachings of the present invention from front elevational, right side elevational, and rear elevational views, respectively, with the left side elevational view, top plan view, and bottom plan view each identical to the right side elevational view.
Figure 5:
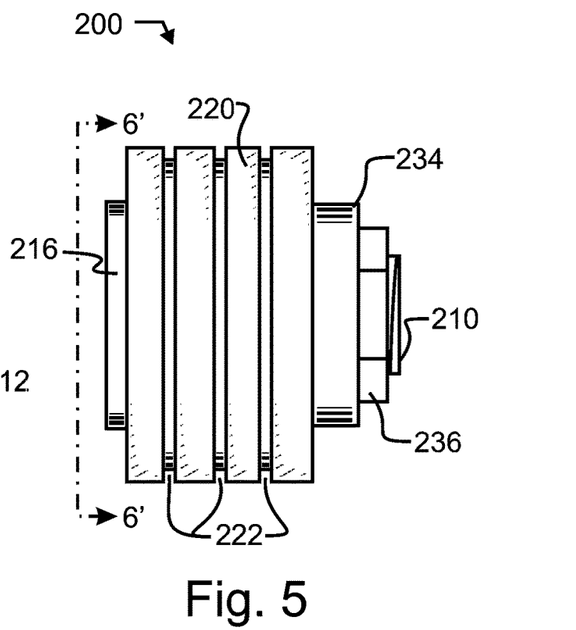
Figure 6:
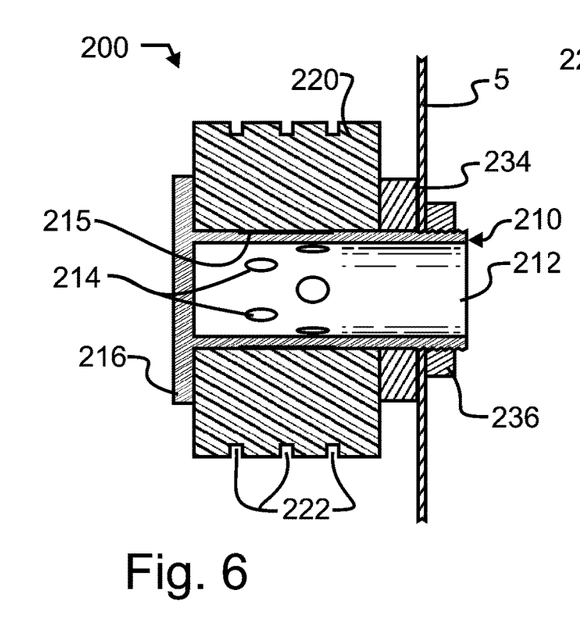
FIG. 6 illustrates the preferred embodiment reduced waste beverage treatment plug of FIGS. 4 and 5 from a vertical plane sectional view taken along section line 6' of FIG. 5.
Figure 7:
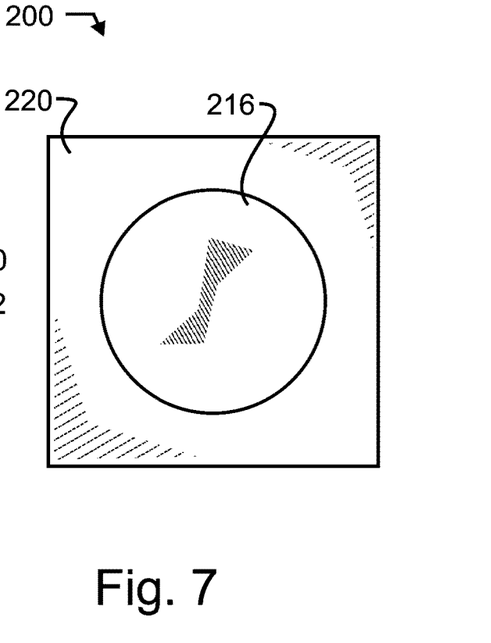

FIGS. 4-6 illustrate a wood plug 200 which is made up of a wood block 220 that has groves 222 cut into it that increase the surface area of the wood block 220. Most preferably, the grain of the wood within wood block 220 extends within a plane parallel to the surface of wood block 220 visible in FIG. 4. To hold wood block 220 in place on the interior of a prior art barrel wall 5, which might for exemplary and non-limiting purpose comprise a portion of a plastic or stainless steel barrel, a hollow bolt 210 is configured to passes through barrel wall 5. Barrel wall 5 is captured between a spacer 234 and nut 236. Hollow bolt 210 has a closed bolt head 216 on one end, and on the opposite or distal end there is a bolt opening 212 that is open to ambient air exterior to the barrel. Located in what will contact or be located adjacent the central part of wood block 220 is bolt fluid exchange 214, which comprises holes through bolt 210, and in some embodiments including as illustrated, one or more channels 215 or in an alternative embodiment a smaller diameter portion of bolt 210 to allow for greater air contact with the interior of wood block 220. In some embodiments of wood plug 200, gaskets may be placed between: bolt head 216 and wood block 220; wood block 220 and spacer 234; spacer 234 and barrel wall 5; and barrel wall 5 and nut 236.

The construction of wood plug 200 relies on a single relatively small piece of high quality wood that would otherwise be considered scrap from the prior art stave and barrel making to fabricate wood block 220. The shape of wood block 220 can be entirely reliant on the size of the scrap. However, to prevent or reduce seepage of liquid from the barrel through the wood plug, a minimum size is required. Due to the way liquid more readily transfers through the end grain of wood when compared to across the grain, wood block 220 may in some embodiments require one length or width dimension be longer than the other in the identifiable direction of the wood grain to prevent liquid leaking from the barrel. Such embodiments will have a non-square but rectangular outline in the view of FIG. 4. Additionally, the optional cut groves 222 in wood block 220 should be spaced such that maximum exposure of the wood grain is achieved and liquid contact and exchange improved, to allow for the desirable exchanges to occur between the liquid and the wood.

In addition to the shape and dimensions of the wood block 220, other aspects of wood plug 200 can be varied. In some embodiments, the material that hollow bolt 210 is made from is varied. The hollow bolt 210 in the preferred embodiment is stainless steel. However, plastic materials will be used in some alternative embodiments to provide alternative attachment means. With a plastic bolt, in some embodiments spacer 234 and nut 236 are replaced by a quick connect which utilizes rubber gaskets and retractable blades in the manner of the well-known plastic push pin. This will allow a person to simply push the bolt 210 through a hole in the barrel wall 5, thereby locking wood plug 200 in place. While the hollow bolt 210 is depicted as round, any suitable shape may be used. In some embodiments, a quadrilateral shape will be used to match the shape and penetration capability of wood block 220 on the inside of the barrel.

While a single hollow bolt 210 is shown, any reasonable number of bolts through the same wood block 220 can be used for different shaped blocks or to keep the maximum quantity of wood retained in wood block 220 while allowing maximum penetration of liquid into the wood block 220. In another alternative embodiment, multiple wood blocks 220 are positioned sequentially on a single hollow bolt 210 with multiple bolt fluid exchanges 214 positioned to allow for a large single spindle of wood blocks 220 to be placed into the barrel with a single bolt opening 212 extending through barrel wall 5 and open to ambient air exterior to the barrel. Wood plug 200 provides an alternative embodiment to wave insert 3 that utilizes the same high quality but dimensionally small stave wood waste material, but also allows for air penetration through the wood in the manner of a traditional oak barrel wall, while being used with any type of barrel, whether the barrel is fabricated from stainless steel, plastic, wood, or other known barrel material. In some embodiments, wood plug 200 will be inserted through a hole in a traditional oak barrel. In such embodiments, wood plug 200 can be used to enhance the performance of a new barrel, while in other embodiments wood plug 200 can be used to refresh an already-used barrel.

While the foregoing details what is felt to be the preferred embodiment of the invention, no material limitations to the scope of the claimed invention are intended. Further, features and design alternatives that would be obvious to one of ordinary skill in the art are considered to be incorporated herein. The scope of the invention is set forth and particularly described in the claims herein below.

We claim:

1. In combination, a wood plug, a beverage aging container, and a beverage contained in said beverage aging container,
    said beverage aging container having at least one wall defining an interior within which said beverage is retained;
    said wood plug comprising:
        a wood block held in place within said beverage aging container interior and exposed on an exterior surface of said wood block to said beverage, said wood block having a pair of opposed sides and wood grain, said wood grain defining a wood grain longitudinal axis; and
        a hollow bolt having a bolt opening exposed to ambient air, a closed bolt head within said beverage aging container interior and distal to said bolt opening, and a bolt fluid exchange passage between said bolt opening and said closed bolt head;
    wherein said bolt fluid exchange passage couples said ambient air to an interior of said wood block to thereby allow for air penetration through said wood block; and
    wherein said wood plug is inserted through and secured by said bolt to said wall in said beverage aging container.

2. The combination wood plug, beverage aging container, and beverage contained in said beverage aging container of claim 1, wherein said bolt fluid exchange passage further comprises at least one hole extending through said hollow bolt at a location between said bolt opening and said closed bolt head.

3. The combination wood plug, beverage aging container, and beverage contained in said beverage aging container of claim 2, wherein said bolt fluid exchange passage further comprises one or more channels coupling said ambient air to an interior of said wood block.

4. The combination wood plug, beverage aging container, and beverage contained in said beverage aging container of claim 2, wherein said wood block further comprises a hole passing entirely through said wood block from a first one of said wood block pair of opposed sides to a second one of said wood block pair of opposed sides.

5. The combination wood plug, beverage aging container, and beverage contained in said beverage aging container of claim 4, wherein said bolt passes through said wood block hole.

6. The combination wood plug, beverage aging container, and beverage contained in said beverage aging container of claim 5, wherein said bolt exterior diameter is smaller than said wood block hole interior diameter, the space therebetween defining an air passage coupling said ambient air to an interior of said wood block.

7. The combination wood plug, beverage aging container, and beverage contained in said beverage aging container of claim 1, wherein said wood grain longitudinal axis lies in a plane parallel to a plane defined by a major surface of a one of said wood block pair of opposed sides.

8. The combination wood plug, beverage aging container, and beverage contained in said beverage aging container of claim 1, wherein said wood grain longitudinal axis is in a plane parallel to and between said pair of opposed sides.

9. The combination wood plug, beverage aging container, and beverage contained in said beverage aging container of claim 1, further comprising a nut affixed to said bolt distal to and on an opposed side of said at least one wall relative to said closed bolt head.

10. In combination, a wood plug, a beverage aging container, and a beverage contained in said beverage aging container,
    said beverage aging container having
        at least one wall defining an interior within which said beverage is retained and an exterior contacting ambient air, and
        an opening in said at least one wall extending from said beverage aging container interior to said beverage aging container exterior;
    said wood plug comprising:
        a hollow bolt terminating at a first end with a bolt opening exterior to said beverage aging container wall and thereby exposed to ambient air, terminating at a second end distal to said bolt opening and within said beverage aging container interior with a closed bolt head, and a bolt fluid exchange passage between said bolt opening and said closed bolt head; and
        a wood block having a pair of opposed sides and wood grain, said wood grain defining a wood grain longitudinal axis, said wood block captured within said beverage aging container interior intermediate between said closed bolt head and said at least one wall and thereby exposed on an exterior thereof to said beverage retained within said beverage aging container interior, and said wood block exposed on an interior thereof to said bolt fluid exchange passage, and thereby coupled to said ambient air to allow air penetration through said wood block;
    said wood plug inserted through and secured to said wall in said beverage aging container.

11. The combination wood plug, beverage aging container, and beverage contained in said beverage aging container of claim 10, wherein said bolt fluid exchange passage further comprises at least one hole extending through said hollow bolt at a location intermediate between said bolt opening and said closed bolt head.

12. The combination wood plug, beverage aging container, and beverage contained in said beverage aging container of claim 11, wherein said bolt fluid exchange passage further comprises one or more channels coupling said ambient air to said wood block interior.

13. The combination wood plug, beverage aging container, and beverage contained in said beverage aging container of claim 11, wherein said wood block further comprises a hole passing entirely through said wood block from a first one of said wood block pair of opposed sides to a second one of said wood block pair of opposed sides.

14. The combination wood plug, beverage aging container, and beverage contained in said beverage aging container of claim 13, wherein said bolt passes through said wood block hole.

15. The combination wood plug, beverage aging container, and beverage contained in said beverage aging container of claim 14, wherein said bolt exterior diameter is smaller than said wood block hole interior diameter, the space therebetween defining an air passage coupling said ambient air to an interior of said wood block.

16. The combination wood plug, beverage aging container, and beverage contained in said beverage aging container of claim 10, wherein said wood grain longitudinal axis lies in a plane parallel to a plane defined by a major surface of a one of said wood block pair of opposed sides.

17. The combination wood plug, beverage aging container, and beverage contained in said beverage aging container of claim 10, further comprising a nut affixed to said bolt distal to and on an opposed side of said at least one wall relative to said closed bolt head.

\* \* \* \* \*